Nov. 25, 1924.  
A. VAN DER SLUIS  
1,517,032  
TRANSMISSION MECHANISM  
Filed March 6, 1924   3 Sheets-Sheet 1
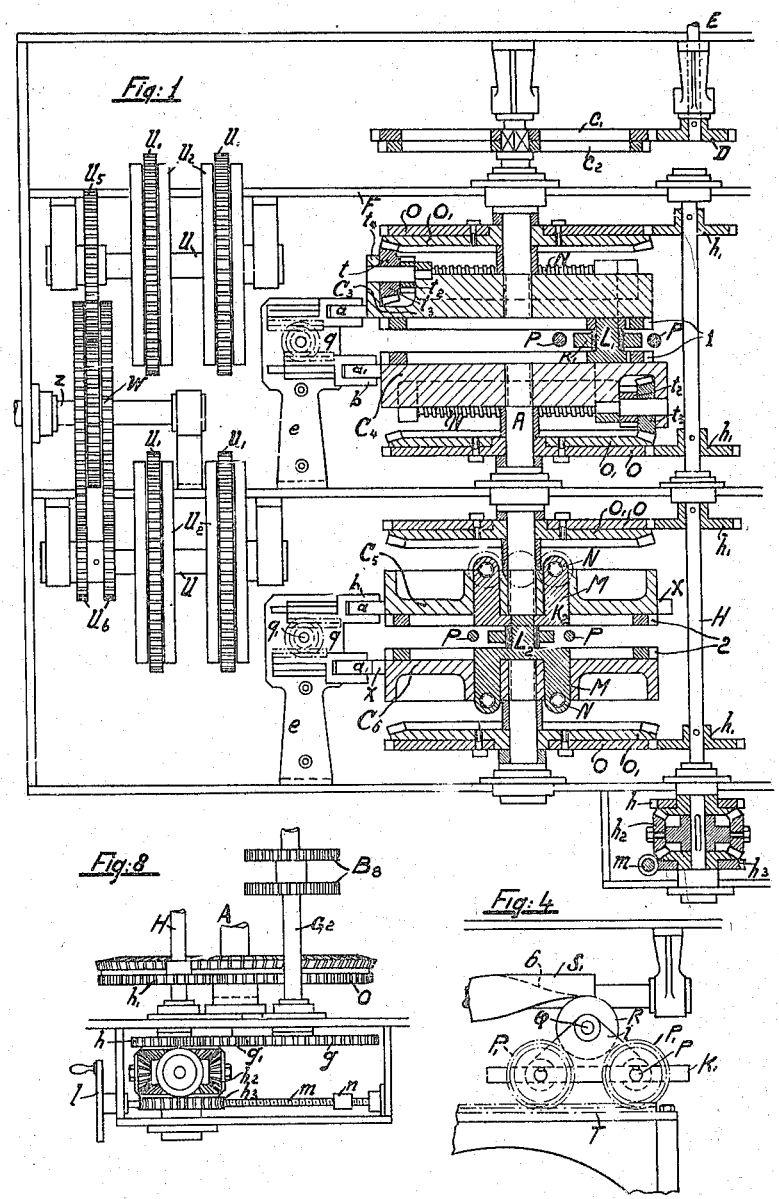

Nov. 25, 1924.　　　　　　　　　　　　　　　　1,517,032
A. VAN DER SLUIS
TRANSMISSION MECHANISM
Filed March 6, 1924　　　3 Sheets-Sheet 2
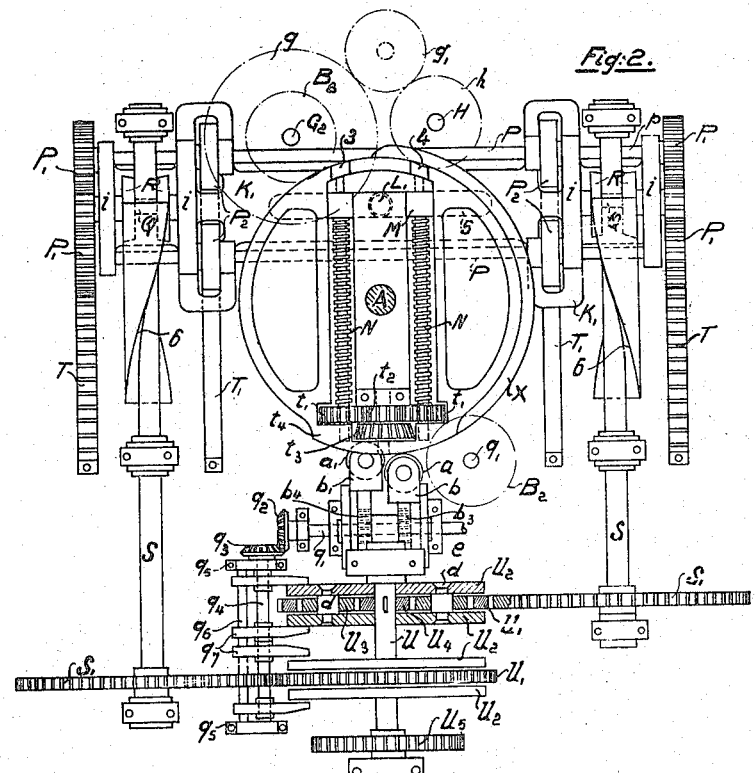
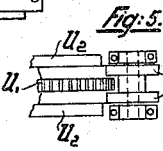
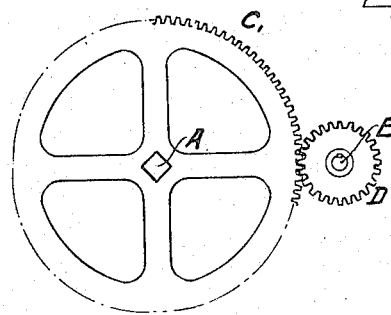
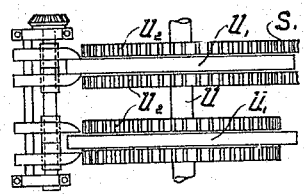
Inventor
A. van der Sluis
By Marks & Clerk
attys.

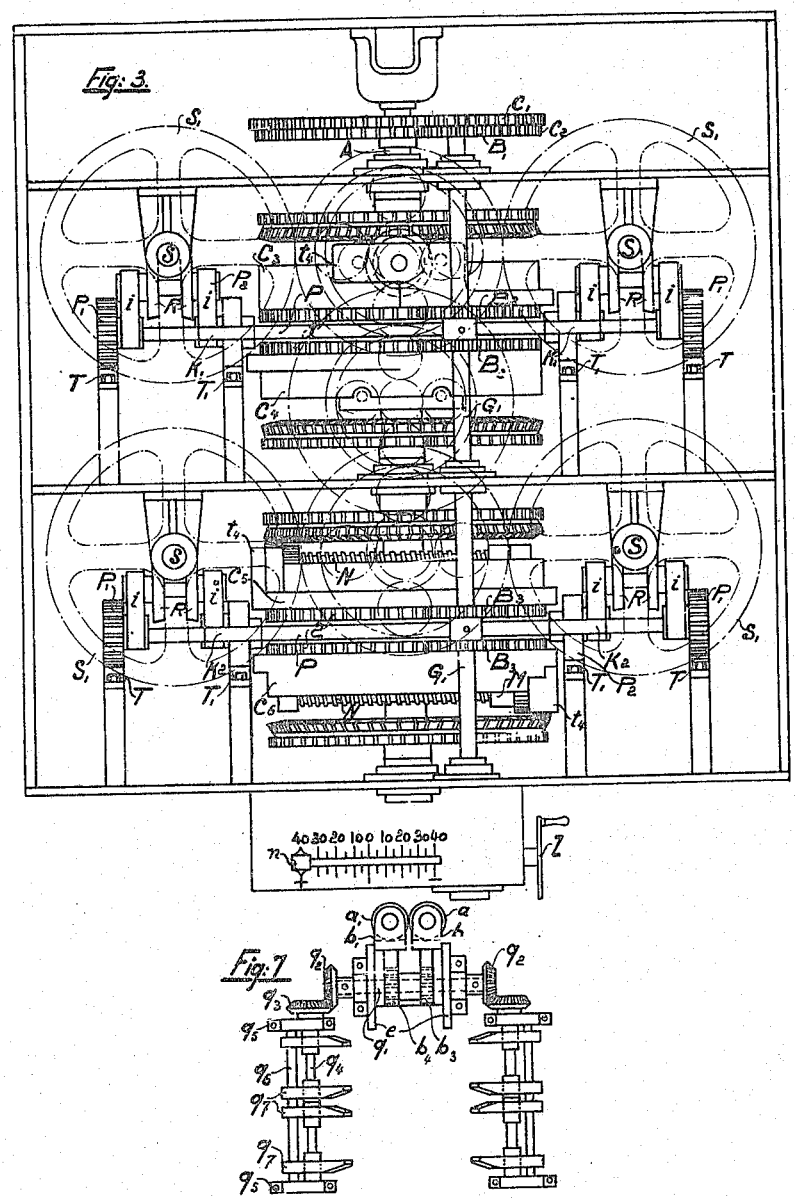

Patented Nov. 25, 1924.

1,517,032

UNITED STATES PATENT OFFICE.

AUKE VAN DER SLUIS, OF THE HAGUE, NETHERLANDS.

TRANSMISSION MECHANISM.

Application filed March 6, 1924. Serial No. 697,374.

*To all whom it may concern:*

Be it known that I, AUKE VAN DER SLUIS, a subject of the Queen of the Netherlands, residing at The Hague, Netherlands, have invented certain new and useful Improvements in and Relating to Transmission Mechanism, of which the following is a specification.

My present invention relates to a transmission mechanism of the type in which the driven shaft is adapted to be rotated by means of cranks of adjustable length, cooperating with reciprocating yokes and with impellers of the ratchet type. In accordance with my present invention the cranks are disposed at right angles to one another and each crank pin engages a slot in its yoke, the gear being so arranged that the reversal of the direction of motion of the driven shaft is effected exclusively by adjustment of the length of the cranks. With my novel mechanism the speed and the direction of rotation of the driven shaft may be controlled with one single handle.

The novel transmission mechanism is adapted for use in marine propulsion, in connection with registering and controlling gear, with machine shop equipment for driving lathes, with warping gear and for many other purposes, it being understood that the invention is not limited to any special or particular use.

In order that the angular speed of the driven shaft may be perfectly uniform, the driving shaft may carry a pinion meshing with a gear wheel on the crank shaft, said pinion and said gear wheel having their pitch curves so formed as to compensate for the accelerations and retardations caused by the crank motion.

In order that my invention may be clearly understood I shall now proceed to describe the same with reference to the annexed drawing which illustrates, by way of example only, a suitable embodiment thereof, and on which:

Fig. 1 shows part of a vertical section through the axis of the crank shaft and parallel with the direction of motion of the yokes, Fig. 2 shows a top view of a crank disc with its impeller group of the ratchet type, Fig. 3 is a vertical elevation of the gear, looking in the direction of motion of the yokes, Fig. 4 is a detail view of the means for transmitting the reciprocatory motion of the yokes into oscillatory motion of shafts, Fig. 5 is a somewhat diagrammatic view of a detail showing rollers V for radially supporting annular gear wheels in epicyclic or sun and planet wheel gear, Fig. 6 is a diagrammatic view of means for immobilizing the annular gear wheel of epicyclic gear, instead of immobilizing the supports of the pinions at either side thereof as shown in Fig. 2, Fig. 7 is a top view of the gripping mechanism for immobilizing either the annular gear wheel, or the supports of the pinions in the epicyclic gear, Fig. 8 illustrates a differential gear for controlling the length of the cranks, and Fig. 9 is a diagrammatic view of the compensating gear wheels.

The driving shaft is designated by E (Fig. 1) and keyed to same is a pinion D meshing with a gear wheel $C^1$ keyed on the crank shaft A. Secured to the crank shaft A is a second gear wheel $C^2$ meshing with a gear $B^1$ keyed on a countershaft $G^1$, Fig. 3.

The counter shaft $G^1$ is provided with two pairs of gear wheels $B^2$ and $B^3$, respectively, of equal diameters and meshing with the gear rims 1 and 2, respectively, of two pairs of crank discs $C^3$, $C^4$, and $C^5$, $C^6$, respectively, secured on the crank shaft A. Each crank disc is provided with parallel ways 3, 4, equidistantly disposed relative to the centre and serving to guide a block M, the blocks M of the discs of one pair together carrying a crank pin $L^1$ and $L^2$, respectively. Diametrically opposite the counter shaft $G^1$ is a second counter shaft $G^2$ having gears similar to the gears $B^1$, $B^2$ and $B^3$, but the gears $B^3$ are the only ones illustrated (see Figs. 2 and 8). The counter shaft $G^1$ only serves to take up bending stresses of the crank shaft A; if desired, it could be dispensed with. Said gears $B^2$, $B^3$ only serve to counteract the bending stresses to which the shaft A is subjected.

The counter shaft $G^2$ (Figs. 2 and 8) transmits its rotation to a controlling shaft H through a gear wheel $g$ and an idler $g^1$ meshing with a spur wheel $h$ secured to one crown wheel of a differential gear, the pinions of which are designated by $h^2$. The support of the pinions $h^2$ is keyed to the controlling shaft H, whereas the second crown wheel is secured to a worm wheel meshing with a worm $m$ adapted to be turned by means of a hand wheel 1. The worm $m$ carries a nut $n$ prevented by suitable means from rotation and provided with a reader cooperating with a graduation, see the lower part of Fig. 3.

Keyed to the controlling shaft H are four gear wheels $h^1$ of equal diameters and meshing with gear wheels O loosely mounted on the crank shaft A. Each gear O is secured to a mitre wheel $O^1$ cooperating with a mitre pinion $t^3$ (Figs. 1 and 2) having secured to it a spur wheel $t^2$ with which it is loosely mounted on a stud shaft supported in its crank disc. Said spur wheel $t^2$ meshes with two spurs $t^1$ each secured to a screw spindle N supported with one end in a bearing of an upstanding flange $t^4$ of the crank disc. Each block M is provided with two nut members for supporting the other ends of the screw spindles of its crank disc so that rotation of the screws of the discs of one pair causes the block to move lengthwise in its ways 3, 4 whereby the distance of the crank pin $L^1$ (or $L^2$) from the axis of the crank shaft A is reduced or increased.

The transmission gear between the countershaft $G^2$ and the controlling shaft H is such that the gear wheels O, $O^1$ normally rotate with the same speed and in the same direction as the crank discs, so that the mitre pinions $t^3$ do not revolve about their axes and the crank pins $L^1$, $L^2$ do not change their distances from the axis of shaft A. If, however, hand wheel 1 is turned, the gears O, $O^1$ are turned relative to the crank discs whereby the length of the cranks is varied.

The crank pins are spaced 90° apart and each of them engages a slot 5 (Fig. 2) of a yoke $K^1$, $K^2$ respectively. Each yoke is provided with rollers $P^2$ running on races $T^1$ in such a manner as to have only freedom of rectilinear reciprocation. The yokes, which are movable in parallel relation with one another, are each provided with two parallel shafts P loosely mounted on which are gear wheels $P^1$ meshing with stationary racks T.

Each yoke is provided with flanges or standards $i$ (Figs. 4 and 2) provided with bearings for shafts Q loosely mounted on each of which are two rollers R. Said rollers engage with cycloidal grooves 6 of shafts S, which are rotatably mounted in the frame of the mechanism but prevented from lengthwise motion therein. It will be understood that when the yokes are reciprocating the rollers R will impart oscillatory motion to the shafts S. The gear wheels $P^1$ and the racks T only serve to insure increased stability so that in certain cases they could be dispensed with.

The rollers R have conical treads so as to insure stability of the yokes in a direction at right angles to the direction of motion.

The oscillation of the two shafts S cooperating with one yoke is transmitted into unidirectional rotation by means of gear wheels $S^1$ mounted on said shafts (Fig. 2) and each cooperating with an epicyclic gear. That is to say, each wheel $S^1$ meshes with the outer gear rim of an annular wheel $U^1$ provided with an inner gear rim meshing with pinions $U^3$. Said pinions $U^3$, which are loosely mounted on shafts $d$ having their bearings in supports $U^2$, mesh with a sun wheel $U^4$ keyed to a shaft U. The supports $U^2$ of the pinions of each epicyclic gear are periodically held against rotation and released by mechanical means in such a manner that, when the corresponding shaft S turns in one direction, the supports $U^2$ are immobilized, whereas they are released during the return swing of said shaft. By these means the shaft U, which is common to the sun wheels $U^4$ of both epicyclic gears, is rotated in one direction only but with a speed that periodically varies.

The automatic means for alternately immobilizing and releasing the supports $U^2$ comprise a concentric cam face X provided on each crank disc and extending through 180°, in such a manner that the cam face on the one crank disc of a pair is located diametrically opposite the cam face on the other disc. The cam face X of each crank disc coacts with an antifriction roller $a$ (or $a^1$), Fig. 7, loosely mounted on a vertical stud shaft supported in a slide $b$ (or $b^1$) adapted to reciprocate in parallel relation with its yoke in a suitable way in a bracket $c$. The slides $b$, $b^1$ are provided with racks $b^3$, $b^4$, respectively, both racks meshing with a pinion $q$ secured on a shaft $q^1$ rotatably mounted in the bracket $c$, it being understood that rack $b^3$ engages the top side of its pinion and rack $b^4$ the lower side thereof. Shaft $q^1$ is provided at each end with a mitre wheel $q^2$ meshing with a mitre wheel $q^3$ on a shaft $q^4$ supported by bearings $q^5$. Each shaft $q^4$ is provided with screw threads both at its end portions and at its middle portion and these threads cooperate with two pairs of nuts secured to which are clutches $q^7$ adapted to be alternately forced into gripping engagement with and to release the supports $U^2$, the said screw threads being, as will be understood, right and left hand threads. The clutches $q^7$ straddle a rod $q^6$ which thus prevents them from rotation so that oscillation of the shaft $q^4$ as a consequence of the cooperation with the cam faces X of the rollers $a$, $a^1$ causes the clutches of each pair to alternately move towards and from each other into and out of engagement with the corresponding supports $U^2$.

It will thus be understood that the crank pin $L^1$ imparts continuous rotation in one direction to its shaft U (Figs. 1 and 2) and to the gear wheel $U^5$ keyed thereon, and that the crank pin $L^2$ in a similar manner imparts unidirectional rotation to the pair of gear wheels $U^6$ on the second shaft U. The spur $U^5$ meshes with the outer gear rim of the annular gear wheel and the spurs $U^6$ mesh with outer gear rims provided on the supports of the pinions of an epicyclic gear W, the sun-wheel of which is secured to the driven shaft Z.

During one complete revolution of the crank shaft A the driven shaft Z will be rotated with a substantially uniform angular speed owing to the fact that the crank pins $L^1$ and $L^2$ are spaced 90° apart. In order now to ensure a perfectly uniform rotation of the driven shaft, the pitch curves of the gear wheel $C^1$ on the crank shaft A and of the pinion D are not true circles, but so formed as to compensate for the variations in the angular speed of the driven shaft caused by the crank motion.

If the crank pin is moved from the one side of the centre of the crank disc to the other side thereof, the direction of rotation of the driven shaft Z is reversed because the cam faces X then cause the clutches $q^7$ to engage the corresponding supports $U^2$ in the other half of one complete revolution of the crank shaft.

When the crank pin is moved away from the centre of the crank disc the rotary speed of the driven shaft Z is proportionally increased. This can be done during the operation of the gear with the aid of the hand wheel 1, so that the rotary speed of the driven shaft can be controlled between zero and a given maximum both in the one and in the other direction.

What I claim is:—

1. A transmission mechanism comprising in combination a driving shaft, a driven shaft, a crank shaft adapted to be driven by the driving-shaft and having two cranks spaced 90° apart and provided with crank pins, means for shifting the positions of the cranks in relation to their axes of rotation, means associated with each crank for converting the crank motion into reciprocatory motion, intermediate shafts, means for converting said reciprocatory motion into uni-directional rotation of said intermediate shafts, and planet gearing simultaneously driven by both last-named shafts and driving the driven shaft.

2. A transmission mechanism as claimed in claim 1 in which the means associated with each crank for converting the crank motion into reciprocatory motion includes a rectilinearly guided yoke having a slot disposed at right angles to the direction of rotation of the yoke and receiving the crank pin.

3. A transmission mechanism as claimed in claim 1 in which the means associated with each crank for converting the crank motion into reciprocatory motion includes a rectilinearly guided yoke having a slot disposed at right angles to the direction of motion of the yoke and receiving the crank pin, said means for converting the reciprocatory motion into uni-directional rotation of the shaft including rollers at opposite sides of each yoke, two shafts disposed in parallel relation with the direction of motion of the yoke and having cycloidal grooves engaging said rollers, a gear wheel secured to each of the last-mentioned shafts, a third shaft, two planet gears disposed on the last-mentioned shaft and cooperatively coupled with said gear wheels, and means controlled by the crank shaft for alternately causing one or the other planet gear to drive the third shaft in one and the same direction.

4. A transmission mechanism as claimed in claim 1 in which the means for shifting the positions of the cranks in relation to their axis of rotation includes gear wheels loosely mounted on the crank shaft, a controlling shaft driven by the crank shaft and normally driving the said loose gear wheels at the same angular speed and in the same direction as the crank shaft, differential gear coupling the crank shaft to the controlling shaft, and mechanism for converting rotation of the loose gear wheels relatively to the crank shaft into radial movement of the crank pins.

5. A mechanism as claimed in claim 1 in which the driving shaft is provided with a pinion and the crank shaft has a gear wheel meshing with said pinion, the pitch curves of said pinion and of said gear wheel being formed to compensate for the variations of the angular speed of the driven shaft caused by the crank motion.

In testimony whereof I affix my signature.

AUKE van der SLUIS.